United States Patent
Mohaupt et al.

(10) Patent No.: US 11,421,982 B2
(45) Date of Patent: Aug. 23, 2022

(54) SYSTEM AND METHOD FOR ESTIMATING TIRE TREAD DEPTH

(71) Applicant: The Goodyear Tire & Rubber Company, Akron, OH (US)

(72) Inventors: Tobias Mohaupt, Hamminkeln (DE); Peter Lenze, Dorsten (DE); Wolfgang Bernt, Marl (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 27 days.

(21) Appl. No.: 17/226,215

(22) Filed: Apr. 9, 2021

(65) Prior Publication Data

US 2021/0372777 A1    Dec. 2, 2021

Related U.S. Application Data

(60) Provisional application No. 63/031,251, filed on May 28, 2020.

(51) Int. Cl.
*B60C 23/04* (2006.01)
*B60C 11/24* (2006.01)
(Continued)

(52) U.S. Cl.
CPC ............ *G01B 11/22* (2013.01); *B60C 11/246* (2013.01); *B60C 23/0411* (2013.01)

(58) Field of Classification Search
CPC ............ B60C 23/0408; B60C 23/0496; B60C 23/061; B60C 23/0494; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062;
(Continued)

(56) References Cited

U.S. PATENT DOCUMENTS

| 6,400,261 B1 | 6/2002 | Starkey et al. |
| 6,518,877 B1 | 2/2003 | Starkey et al. |

(Continued)

FOREIGN PATENT DOCUMENTS

| GB | 2512411 A | 10/2014 | |
| WO | WO-2010115390 A1 * | 10/2010 | ........... B60C 11/246 |

(Continued)

OTHER PUBLICATIONS

EPO Search Report received by Applicant dated Oct. 5, 2021.

*Primary Examiner* — Andre J Allen
(74) *Attorney, Agent, or Firm* — Edward T. Kennedy

(57) ABSTRACT

A system is provided for estimating a tread depth of a tire supporting a vehicle. The tire includes a pair of sidewalls that extend to a circumferential tread. The system includes a drive over reader, which includes a housing. At least one sensor is mounted in the housing to generate an image of the tire, which may be an image of the tire footprint or an image of the tread along a lateral line or section, and the tread depth is determined from the image. At least one piezoelectric actuator is mounted on the housing and is electrically connected to the at least one sensor to actuate the at least one sensor. A method for estimating a tread depth of a tire supporting a vehicle is also provided.

18 Claims, 4 Drawing Sheets

(51) Int. Cl.
*G01M 17/02* (2006.01)
*G01B 11/22* (2006.01)

(58) Field of Classification Search
CPC ............ B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 220/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22

See application file for complete search history.

(56) References Cited

U.S. PATENT DOCUMENTS

| | | | |
|---|---|---|---|
| 6,591,671 | B2 | 7/2003 | Brown |
| 7,222,522 | B2 | 5/2007 | Monguzzi et al. |
| 7,269,997 | B2 | 9/2007 | Dale, Jr. et al. |
| 7,578,180 | B2 | 8/2009 | Lionetti et al. |
| 7,942,048 | B2 | 5/2011 | Pingel et al. |
| 7,969,293 | B2 | 6/2011 | Benedict et al. |
| 8,065,911 | B2 | 11/2011 | Taylor et al. |
| 8,312,766 | B2 | 11/2012 | Pingel |
| 8,621,919 | B2 | 1/2014 | Pingel |
| 8,833,152 | B2 | 9/2014 | Schaefer |
| 9,000,923 | B2 | 4/2015 | Benedict |
| 9,057,658 | B2 | 6/2015 | Rose et al. |
| 9,079,461 | B2 | 7/2015 | Suh et al. |
| 9,183,423 | B2 | 11/2015 | Batcho, Sr. et al. |
| 9,677,973 | B1 | 6/2017 | Carroll et al. |
| 9,779,561 | B1 * | 10/2017 | Dorrance ............ G07C 5/0808 |
| 9,805,697 | B1 | 10/2017 | Dorrance et al. |
| 10,222,299 | B2 | 3/2019 | Ledoux et al. |
| 10,789,773 | B2 | 9/2020 | Zoken et al. |
| 2015/0075271 | A1 * | 3/2015 | Tracy ................ G01M 17/027 73/146 |
| 2015/0330773 | A1 * | 11/2015 | Uffenkamp ............ G01B 11/25 356/631 |
| 2017/0030806 | A1 * | 2/2017 | Lee ...................... G01M 17/02 |
| 2017/0254727 | A1 | 9/2017 | Zoken et al. |
| 2021/0155055 | A1 * | 5/2021 | Nevin ................. B60C 11/243 |

FOREIGN PATENT DOCUMENTS

| | | | | |
|---|---|---|---|---|
| WO | WO-2013170999 | A1 * | 11/2013 | ........... B60C 25/007 |
| WO | WO-2017187164 | A1 * | 11/2017 | ........... B60C 11/246 |
| WO | WO-2019232145 | A1 * | 12/2019 | |
| WO | WO-2020086698 | A1 * | 4/2020 | |

* cited by examiner

SYSTEM AND METHOD FOR ESTIMATING TIRE TREAD DEPTH

FIELD OF THE INVENTION

The invention relates generally to tire monitoring. More particularly, the invention relates to systems and methods that sense a tread depth of a vehicle tire when the vehicle is driven over a reader or station. Specifically, the invention is directed to a drive over reader system that includes piezoelectric actuation.

BACKGROUND OF THE INVENTION

Multiple tires support a vehicle, and transmit driving and braking forces from the vehicle to the road surface. It is beneficial to periodically measure the wear of the tires, as tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire, which is indicated as the tire wear state. It is to be understood that for the purpose of convenience, the terms "tread wear" and "tire wear" may be used interchangeably.

One approach to the monitoring and/or measurement of tread wear has been to measure the tread depth of a tire mounted on a vehicle as the vehicle drives over a station and the tire passes over a sensor mounted in the station, which is known in the art as a drive over reader. The tread depth is measured when the tire is positioned over or adjacent the sensor, depending on the sensor that is employed.

The advantages of a drive over reader include static positioning of the tire tread over the reader contact surface during a short time interval, which enables the tread depth to be determined using contact or contactless methods. Examples of such methods include ultrasonics, radar reflectivity or other optical methods, such as laser triangulation or light section processes, which generate an image of the tire footprint or an image of the tire tread along a lateral line or section. The tread depth is determined from the image.

As with any wear measurement technique, the precision and repeatability of the tread depth measurement taken by a drive over reader are important considerations. A factor affecting precision and repeatability is the actuation of the drive over reader sensor. For example, in the prior art, the sensor of the drive over reader has been actuated by a photoelectric or mechanical actuator. A photoelectric actuator detects a change in light caused by the position of the vehicle and/or tire to actuate the sensor. A mechanical actuator requires mechanical contact between components when the vehicle and/or tire rides over the reader to actuate the sensor.

Photoelectric and mechanical actuators include disadvantages that affect the precision and repeatability of the drive over reader sensor. For example, photoelectric and mechanical actuators may be subject to adverse functional effects from environmental conditions such as rain, snow and ice. They may also experience false triggers, undesirably actuating the drive over reader sensor at the wrong time, and may have slow reaction times, leading to delayed actuation of the sensor. In addition, such prior art actuators may lack robustness for extended operation.

As a result, there is a need in the art for a system and method of estimating tire tread depth with a drive over reader that includes actuation which is resistant to environmental conditions, experiences fewer false triggers, has a quick reaction time, and is robust.

SUMMARY OF THE INVENTION

According to an aspect of an exemplary embodiment of the invention, a system is provided for estimating a tread depth of a tire supporting a vehicle. The tire includes a pair of sidewalls extending to a circumferential tread. The system includes a drive over reader, which includes a housing. At least one sensor is mounted in the housing to generate an image of the tire, and the tread depth is determined from the image. At least one piezoelectric actuator is mounted on the housing and is electrically connected to the at least one sensor to actuate the at least one sensor.

According to another aspect of an exemplary embodiment of the invention, a method for estimating a tread depth of a tire supporting a vehicle includes providing a drive over reader. The drive over reader includes a housing, and at least one sensor is mounted in the housing. An image of the tire is generated with the at least one sensor to determine the tread depth of the tire. At least one piezoelectric actuator is mounted on the housing, and the at least one piezoelectric actuator is electrically connected to the at least one sensor to actuate the at least one sensor.

BRIEF DESCRIPTION OF THE DRAWINGS

The invention will be described by way of example and with reference to the accompanying drawings, in which.

Similar numerals refer to similar parts throughout the drawings.

DEFINITIONS

"Axial" and "axially" means lines or directions that are parallel to the axis of rotation of the tire.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint of the tire as measured under normal load and tire inflation, the lines being parallel to the equatorial centerplane.

"Net contact area" means the total area of ground contacting tread elements between the lateral edges around the entire circumference of the tread of the tire divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

"Tread Arc Width" means the arc length of the tread of the tire as measured between the lateral edges of the tread.

DETAILED DESCRIPTION OF THE INVENTION

Figure 1:
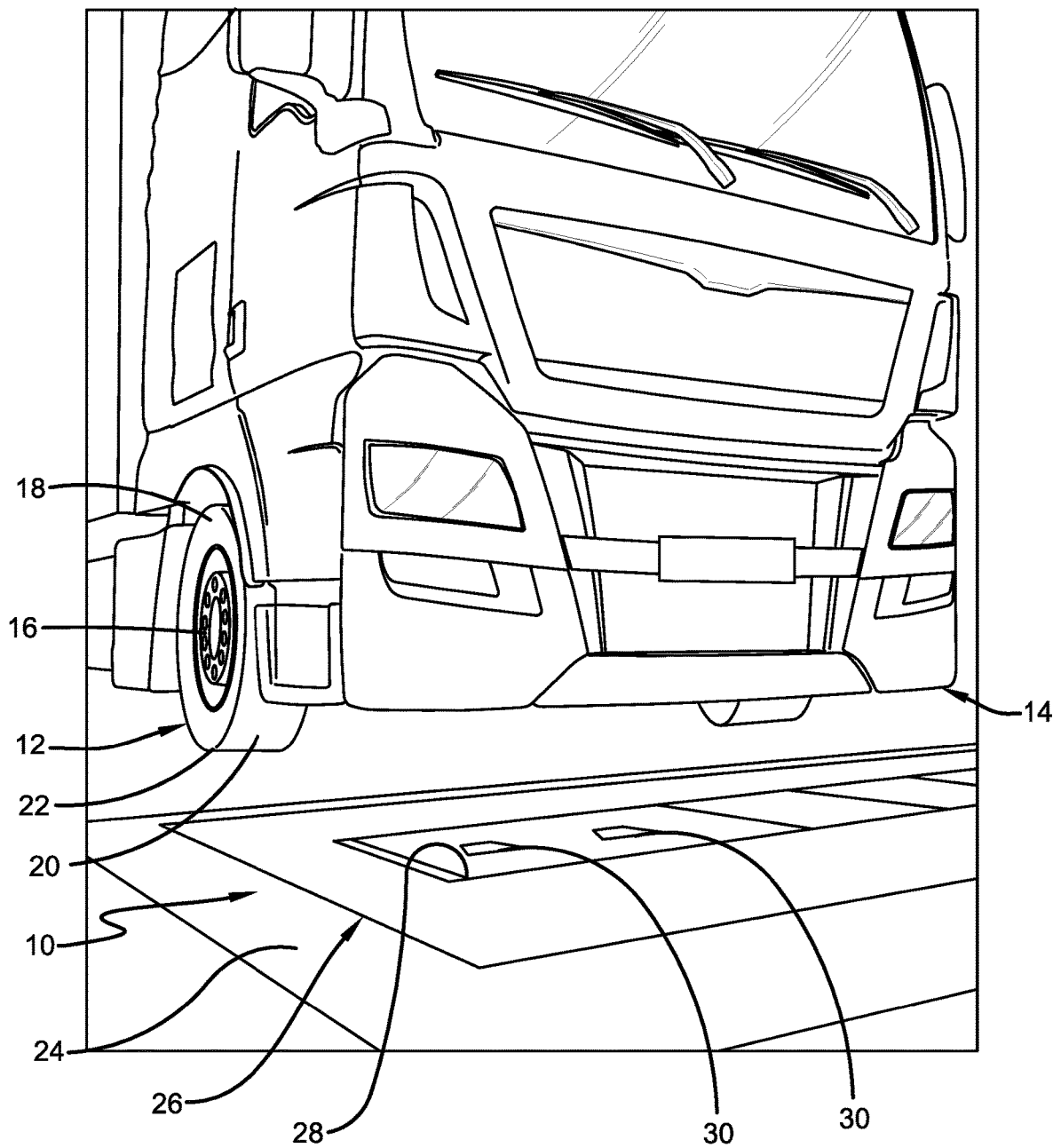
FIG. 1 is a schematic perspective view of an exemplary embodiment of the system for estimating tire tread depth of the present invention, shown installed in the ground and with a vehicle approaching the system.

With reference to FIGS. 1 through 3B, an exemplary embodiment of the system for estimating tire tread depth of the present invention is indicated at 10. As shown in FIG. 1, the system 10 estimates the tread depth of each tire 12 supporting a vehicle 14. It is to be understood that the vehicle 14 may be any vehicle type, and is shown by way of example as a commercial vehicle.

The tires 12 are of conventional construction, and each tire is mounted on a respective wheel 16 as known to those skilled in the art. Each tire 12 includes a pair of sidewalls 18 that extend to a circumferential tread 20, which wears with age from road abrasion. As each tire 12 rolls over the ground 24, a footprint 22 is created, which is the area of contact of the tread 20 with the ground.

Figure 2:
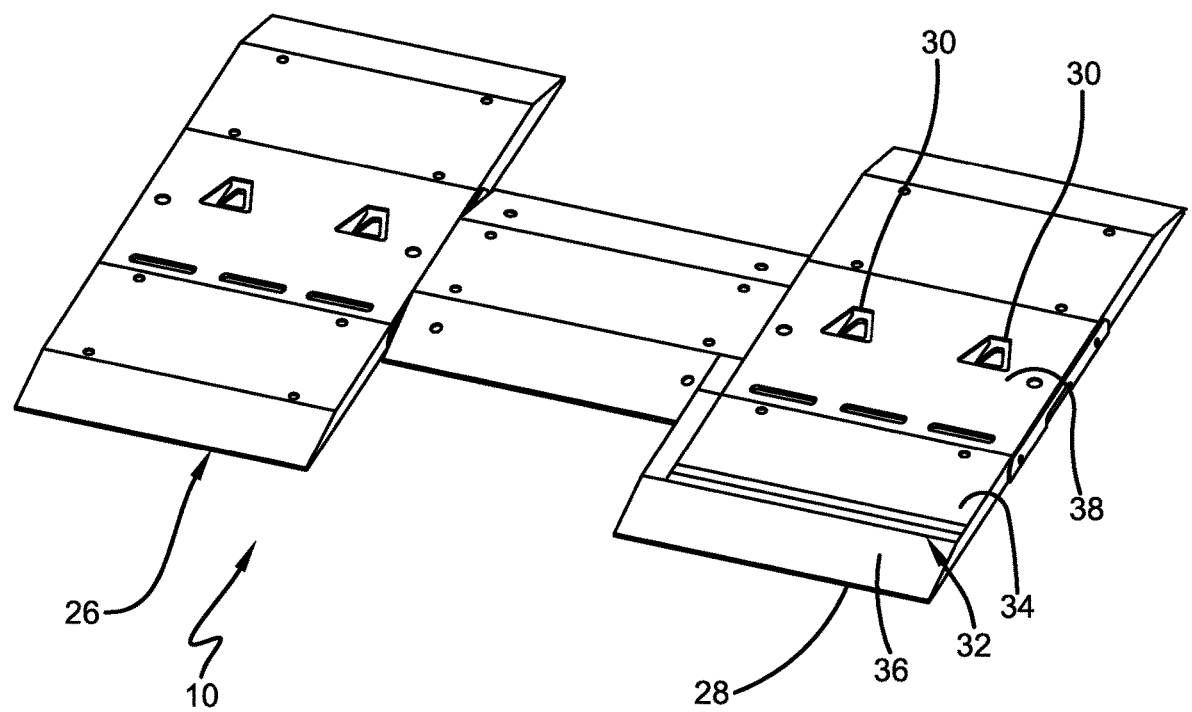
FIG. 2 is a schematic perspective view of the system for estimating tire tread depth of the present invention shown in FIG. 1.

With additional reference to FIG. 2, the system 10 includes a drive over reader 26, which is mounted in or on the ground 24. The drive over reader 26 includes a housing 28 and at least one sensor 30 mounted in the housing. Preferably, a plurality of sensors 30 is mounted in the housing 28. The driver of the vehicle 14 directs the vehicle over the drive over reader 26, which causes each tire 12 to roll over the reader. When the tire 12 is positioned over or adjacent the sensors 30, an image of the footprint 22 or an image of the tread 20 along a lateral line or section is generated by the sensors using techniques such as ultrasonics, radar reflectivity, laser triangulation or light section processes. Preferably, laser triangulation is employed. The depth of the tread 20 of the tire 12 is determined from the image. Techniques for generating the image and measuring the depth of the tread 20 from the image are described by way of example in U.S. Pat. Nos. 8,621,919; 8,312,766; and 7,942,048, all of which are owned by the Assignee of the present invention, The Goodyear Tire & Rubber Company, and which are incorporated herein by reference.

As described above, actuation of the sensors 30 is important, as the actuation affects the precision and repeatability of the tread depth measurement taken by the drive over reader 26. It is desirable for actuation of the sensors 30 to be resistant to environmental conditions, resist false triggering or actuation, have a quick reaction time for fast sensor actuation, and be robust for extended operation.

The system for estimating tire tread depth 10 includes the drive over reader 26, which in turn includes at least one piezoelectric actuator 32 that actuates the sensors 30. The piezoelectric actuator 32 is mounted on a horizontal upper surface 34 of the driver over reader housing 28, preferably on a proximal end 36 of the housing. By being mounted on the horizontal upper surface 34, the piezoelectric actuator 32 readily detects the presence of the tire 12 rolling onto the drive over reader 26. In addition, by being mounted on the proximal end 36 of the housing 28, the piezoelectric actuator 32 promptly detects the tire 12 to actuates the sensors 30 as the tire contacts a sensor area 38 of the drive over reader 26. More particularly, the piezoelectric actuator 32 employs a piezoelectric effect to measure the change in force or pressure created by the tire 12 rolling onto the housing 28, converting that change into an electrical charge which actuates the sensors 30.

Figure 3A:
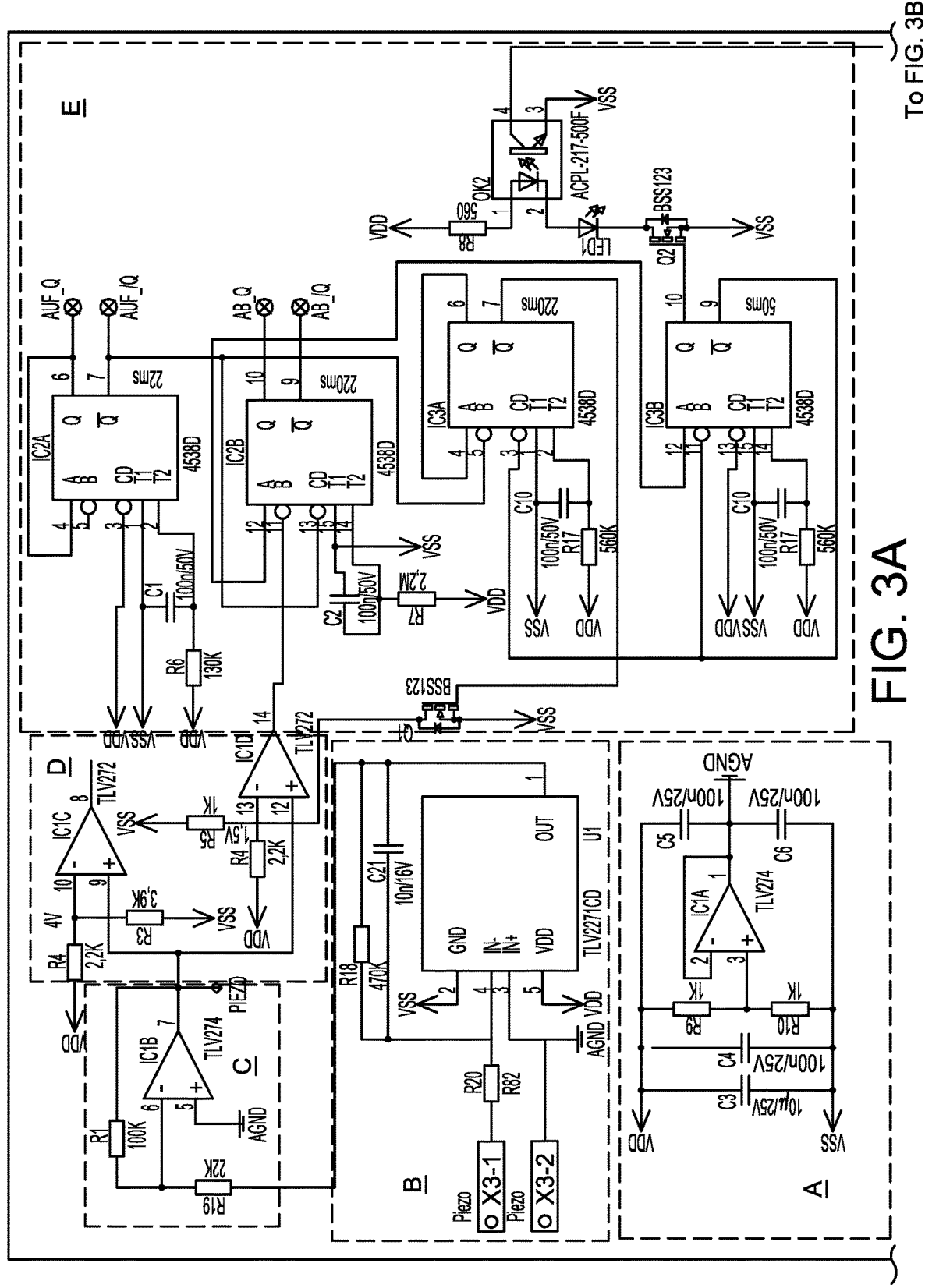
FIGS. 3A and 3B are schematic diagrams of a control system of the system for estimating tire tread depth shown in FIG. 1.
Figure 3B:
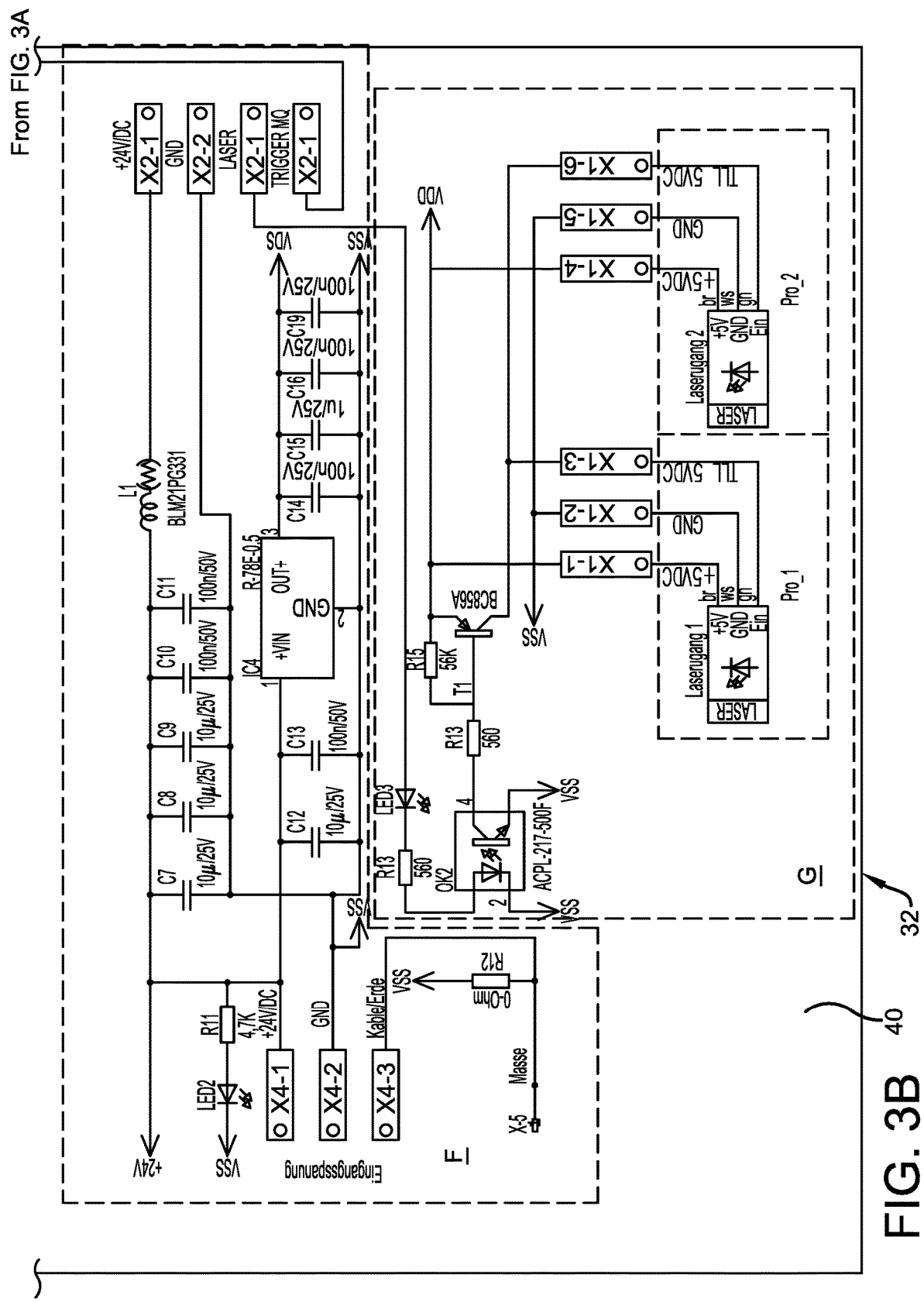

Turning to FIGS. 3A and 3B, a control circuit 40 of the piezoelectric actuator 32 for actuating the sensors 30 is shown. A first portion of the control circuit 40, indicated at A, provides an actuation signal through a piezo wire connection. A type TLV2771 OP operational amplifier preferably is employed for the piezo wire connection. An operational amplifier OP-IC1A is responsible for the provision of a dual power supply for four OP output amplifiers of the type TLV274 preferably used in the control circuit 40.

A second portion of the control circuit 40, indicated at B, includes an operational amplifier OP-U1 that is built as an integrator circuit, and converts the incoming piezo signal into a usable signal form. The ascent signal and the descent signal are recognized by outputting different potential directions (+/−), based on the analog ground (AGND) potential, as well as the pressure that is exerted on the piezo wire, which may be recognized by different voltage levels of the output voltage. The design of R and C is determined by the vehicle weight, tire width and driving speed.

A third portion of the control circuit 40, indicated at C, includes operational amplifier OP-IC1B, which serves to amplify the signal coming from the piezo wire, thereby adapting to the piezo wire. A fourth portion of the control circuit 40, indicated at D, includes operational amplifiers IC1C and IC1D, which are connected as comparators in order to recognize the signal voltage generated by the piezo wire by pressure, after amplification by IC1B, and to switch it through as a trigger signal for further processing from a predetermined voltage level. The IC1C amplifier detects the positive voltage that occurs when the piezo wire is opened, and the IC1D amplifier detects the negative voltage that occurs when the piezo wire is unopened. The two comparator voltages are related to a vehicle speed sensor signal.

A fifth portion of the control circuit 40, indicated at E, includes a monostable multivibrator IC2A. If a start-up signal with a sufficient voltage level is available, pin 5 of the monostable multivibrator IC2A is triggered by pin 8 of the IC1C amplifier and thus blocks the possible triggering of a monostable multivibrator IC2B for approximately 20 milliseconds (ms). This is responsible for detecting a negative voltage signal when a vehicle leaves the piezo wire, from pin 7 of the monostable multivibrator IC2A to pin 13 of the monostable multivibrator IC2B. Due to this time blocking, noises or short vibrations, which can include both positive and negative voltage levels and are shorter than 20 ms, cannot be passed on to the MQ as trigger signals. The time of 20 ms results from a preferred maximum crossing speed of 20 kilometers per hour (km/h) and an assumed tire footprint length of 10 centimeters (cm).

After the blocking time by the monostable multivibrator IC2A of 20 ms, a negative voltage level, which occurs when the tire rolls off the piezo wire and is detected by the IC1D amplifier, can be switched as a trigger signal to pin 11 of the monostable multivibrator IC2B, which now triggers the monostable multivibrator IC3B. The connection is from pin 10 of the monostable multivibrator IC2B to pin 12 of the monostable multivibrator IC3B. The Q output from pin 10 of the monostable multivibrator IC3B then sends a trigger pulse of 50 ms across the transistor Q2 and OK1 to the MQ.

A faulty trigger may result from the occurrence of negative voltages from the piezo wire due to noise, without a positive voltage signal from the tire having been detected beforehand. Because the monostable multivibrator IC2A evaluates positive signals, errors due to such faulty triggers are not intercepted by the monostable multivibrator IC2A. Therefore, an additional monostable multivibrator IC3A is provided, which is only triggered if the positive voltage upon ascent of the tire on the piezo wire is detected first. The connection is from pin 7 of the monostable multivibrator IC2A to pin 5 of the monostable multivibrator IC3A.

When the monostable multivibrator IC3A is set, it provides output from pin 7, blocking of the possibility of detection of a negative signal level. This is controlled by triggering the transistor Q1, which blocks the comparator amplifier IC1D. In this manner, no negative signals can trigger a pulse to the MQ without a positive signal being recognized beforehand. The delay time is dimensioned so that a negative signal can be recognized at 220 ms, even when crossing the piezo wire slowly. After crossing the piezo wire and triggering the MQ, the monostable multivibrator IC3A is reset at pin 3 from pin 9 of the monostable multivibrator IC3B. The reset enables incoming negative signals to be blocked again by the transistor Q1. A new arrival of a positive signal restarts the control process that is described above.

A sixth portion of the control circuit 40 is indicated at F and shows the voltage distribution. Power is supplied by a 24 volt direct current (V/DC) power supply unit, which is located in a remote printed circuit (PC) distributor and is connected to the X4 terminal block through a supply line. One task of the control circuit 40 is to supply a MiniQuatrix with 24V/DC voltage. The incoming supply voltage is switched through to the MiniQuatrix through a filter stage, C7 to C11 and L1, through terminals X2-1 and X2-2. A task of the power supply is to supply the components on the control circuit 40 and lasers of the sensors 30, which are connected to the control circuit with 5V/DC, and is enabled by an integrated voltage regulator IC4. To absorb voltage peaks and perform smoothing, capacitors are connected before and after the controller.

A seventh portion of the control circuit 40 is indicated at G and shows the connection to the laser(s) of the sensors 30. A switch-on pulse for the laser is generated in the MiniQuatrix and transmitted to the control board through terminal X2-3. An optocoupler is connected in the signal path for voltage decoupling between the MiniQuatrix and the control circuit 40. At the output of the optocoupler, the control signal for the laser(s) is amplified by transistor T1 and switched through to the laser(s) through a terminal strip.

In this manner, the system for estimating tire tread depth 10 includes at least one piezoelectric actuator 32 that actuates the sensors 30. The piezoelectric actuator 32 is mounted on the housing 28 of a drive over reader 26, and is electrically connected to the sensors 30 by a control circuit 40. The actuator 32 employs a piezoelectric effect to measure the change in force or pressure created by the tire 12 rolling onto the drive over reader housing 28, and uses the control circuit 40 to convert the change into an electrical charge which actuates the sensors 30.

The use of the piezoelectric actuator 32 enables the system for estimating tire tread depth 10 to provide a drive over reader 26 with optimum actuation for precise and repeatable tread depth measurements. More particularly, by employing piezoelectric effect, the system 10 is resistant to adverse functional effects from environmental conditions such as rain, snow and ice. The piezoelectric effect of the actuator 32 also resists false triggers, and provides a quick reaction time for fast actuation of the sensors 30. In addition, the piezoelectric actuator 32 is robust, thereby enabling extended operation of the system 10.

The present invention also includes a method for estimating tread depth of a tire 12. The method includes steps in accordance with the description that is presented above and shown in FIGS. 1 through 3B.

It is to be understood that the steps and accompanying structure of the above-described system and method for estimating tire tread depth of the present invention 10 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for estimating a tread depth of a tire supporting a vehicle, the tire including a pair of sidewalls extending to a circumferential tread, the system including:
    a drive over reader, wherein the drive over reader includes:
        a housing;
        at least one sensor mounted in the housing to generate an image of the tire, whereby the tread depth is determined from the image; and
        at least one piezoelectric actuator mounted on the housing and electrically connected to the at least one sensor to actuate the at least one sensor.

2. The system for estimating a tread depth of a tire supporting a vehicle of claim 1, wherein the at least one piezoelectric actuator employs a piezoelectric effect to measure a change of pressure created by the tire on the drive over reader to actuate the at least one sensor.

3. The system for estimating a tread depth of a tire supporting a vehicle of claim 2, wherein the electrical connection of the at least one piezoelectric actuator to the at least one sensor includes a control circuit.

4. The system for estimating a tread depth of a tire supporting a vehicle of claim 3, wherein the control circuit converts the change of pressure into an electrical charge to actuate the at least one sensor.

5. The system for estimating a tread depth of a tire supporting a vehicle of claim 1, wherein the at least one piezoelectric actuator is mounted on a horizontal upper surface of the driver over reader housing.

6. The system for estimating a tread depth of a tire supporting a vehicle of claim 1, wherein the at least one piezoelectric actuator is mounted on a proximal end of the drive over reader housing.

7. The system for estimating a tread depth of a tire supporting a vehicle of claim 1, wherein the at least one sensor employs laser triangulation.

8. The system for estimating a tread depth of a tire supporting a vehicle of claim 1, wherein the image of the tire includes an image of a footprint of the tire.

9. The system for estimating a tread depth of a tire supporting a vehicle of claim 1, wherein the image of the tire includes an image of the tread along a lateral line or section.

10. A method for estimating a tread depth of a tire supporting a vehicle, the method including the steps of:
  providing a drive over reader, the drive over reader including a housing;
  mounting at least one sensor in the housing;
  generating an image of the tire to determine the tread depth of the tire;
  mounting at least one piezoelectric actuator on the housing; and
  electrically connecting the at least one piezoelectric actuator to the at least one sensor to actuate the at least one sensor.

11. The method for estimating a tread depth of a tire supporting a vehicle of claim 10, wherein actuation of the at least one sensor includes using a piezoelectric effect to measure a change of pressure created by the tire on the drive over reader with the at least one piezoelectric actuator.

12. The method for estimating a tread depth of a tire supporting a vehicle of claim 11, wherein the step of electrically connecting the at least one piezoelectric actuator to the at least one sensor to actuate the at least one sensor includes providing a control circuit.

13. The method for estimating a tread depth of a tire supporting a vehicle of claim 12, further comprising converting the change of pressure into an electrical charge with the control circuit to actuate the at least one sensor.

14. The method for estimating a tread depth of a tire supporting a vehicle of claim 10, wherein the step of mounting at least one piezoelectric actuator on the housing includes mounting the at least one piezoelectric actuator on a horizontal upper surface of the driver over reader housing.

15. The method for estimating a tread depth of a tire supporting a vehicle of claim 10, wherein the step of mounting at least one piezoelectric actuator on the housing includes mounting the at least one piezoelectric actuator on a proximal end of the drive over reader housing.

16. The method for estimating a tread depth of a tire supporting a vehicle of claim 10, wherein the step of generating an image of the tire includes laser triangulation.

17. The method for estimating a tread depth of a tire supporting a vehicle of claim 10, wherein the step of generating an image of the tire includes generating an image of a footprint of the tire.

18. The method for estimating a tread depth of a tire supporting a vehicle of claim 10, wherein the step of generating an image of the tire includes generating an image of the tread along a lateral line or section.

* * * * *